(12) United States Patent
Bailor

(10) Patent No.: US 10,733,151 B2
(45) Date of Patent: Aug. 4, 2020

(54) TECHNIQUES TO SHARE MEDIA FILES

(75) Inventor: Jonathan Bailor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 13/282,595

(22) Filed: Oct. 27, 2011

(65) Prior Publication Data

US 2013/0110890 A1 May 2, 2013

(51) Int. Cl.
*G06F 16/176* (2019.01)
*G06F 16/435* (2019.01)
*G06F 16/182* (2019.01)

(52) U.S. Cl.
CPC .......... *G06F 16/176* (2019.01); *G06F 16/183* (2019.01); *G06F 16/435* (2019.01)

(58) Field of Classification Search
USPC ........................................................ 707/827
See application file for complete search history.

(56) References Cited

U.S. PATENT DOCUMENTS

| | | |
|---|---|---|
| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,819,284 A | 10/1998 | Farber et al. |
| 5,890,181 A | 3/1999 | Selesky et al. |
| 5,959,621 A | 9/1999 | Nawaz et al. |
| 6,026,474 A | 2/2000 | Carter et al. |
| 6,067,551 A | 5/2000 | Brown et al. |
| 6,088,706 A | 7/2000 | Hild |
| 6,188,405 B1 | 2/2001 | Czerwinski et al. |
| 6,192,378 B1 | 2/2001 | Abrams et al. |
| 6,216,141 B1 | 4/2001 | Straub et al. |

(Continued)

FOREIGN PATENT DOCUMENTS

| | | |
|---|---|---|
| CN | 1489075 A | 4/2004 |
| CN | 102016834 A | 4/2011 |

(Continued)

OTHER PUBLICATIONS

"Digi-Data LeapDrive Service", Retrieved at <<https://www.leapdrive.com/LD/dl/LeapDrive%20Overview.pdf>>, Sep. 10, 2008, pp. 1-14.

(Continued)

*Primary Examiner* — James Trujillo
*Assistant Examiner* — Kurt A Mueller

(57) ABSTRACT

Techniques to share media files are described. An apparatus may comprise a processor and a memory communicatively coupled to the processor. The memory may store an application having a media share component operative to share a media file among a defined set of users. The media share component may comprise multiple software modules, including a file manager module and a file reference module. The file manager module may be operative to determine a network storage location for the media file. The file reference module may be operative to automatically generate a valid link to the network storage location for the media file. The valid link may be specifically arranged to permit access to the network storage location for the media file by the defined set of users of the application. Other embodiments are described and claimed.

20 Claims, 12 Drawing Sheets

(56) References Cited

U.S. PATENT DOCUMENTS

| | | | |
|---|---|---|---|
| 6,243,676 B1 | 6/2001 | Witteman | |
| 6,278,448 B1 | 8/2001 | Brown et al. | |
| 6,311,058 B1 | 10/2001 | Wecker et al. | |
| 6,314,425 B1 | 11/2001 | Serbinis et al. | |
| 6,360,254 B1 | 3/2002 | Linden et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,523,134 B2 | 2/2003 | Korenshtein | |
| 6,724,403 B1 | 4/2004 | Santoro et al. | |
| 6,772,154 B1 | 8/2004 | Daynes et al. | |
| 6,807,558 B1 | 10/2004 | Hassett et al. | |
| 6,832,355 B1 | 12/2004 | Duperrouzel et al. | |
| 6,976,210 B1 | 12/2005 | Silva et al. | |
| 7,028,264 B2 | 4/2006 | Santoro et al. | |
| 7,054,905 B1 * | 5/2006 | Hanna | G06Q 10/107 709/206 |
| 7,107,294 B2 | 9/2006 | Romanufa et al. | |
| 7,155,666 B2 | 12/2006 | Breuer et al. | |
| 7,272,639 B1 | 9/2007 | Levergood et al. | |
| 7,370,269 B1 | 5/2008 | Prabhu et al. | |
| 7,376,907 B2 | 5/2008 | Santoro et al. | |
| 7,499,955 B2 | 3/2009 | Kao et al. | |
| 7,512,607 B2 | 3/2009 | Nagano et al. | |
| 7,536,713 B1 | 5/2009 | Bartholomew | |
| 7,543,047 B2 | 6/2009 | Park et al. | |
| 7,707,210 B2 | 4/2010 | Stefik et al. | |
| 7,792,788 B2 | 9/2010 | Melmon et al. | |
| 7,797,274 B2 | 9/2010 | Stratheam et al. | |
| 7,814,172 B2 | 10/2010 | Martin et al. | |
| 7,823,060 B2 | 10/2010 | Mohamed | |
| 7,900,142 B2 | 3/2011 | Baer | |
| 7,933,632 B2 | 4/2011 | Flynt et al. | |
| 7,937,663 B2 | 5/2011 | Parker et al. | |
| 7,962,853 B2 | 6/2011 | Bedi et al. | |
| 7,979,804 B1 | 7/2011 | Schang | |
| 7,987,431 B2 | 7/2011 | Santoro et al. | |
| 7,996,566 B1 * | 8/2011 | Sylvain et al. | 709/248 |
| 8,032,930 B2 | 10/2011 | Hicks | |
| 8,209,603 B2 | 6/2012 | Bailor et al. | |
| 8,239,760 B2 | 8/2012 | Hanson et al. | |
| 8,346,966 B1 * | 1/2013 | Phatak | H04L 67/06 709/245 |
| 8,352,870 B2 | 1/2013 | Bailor et al. | |
| 8,364,951 B2 | 1/2013 | Peterka et al. | |
| 8,407,670 B2 | 3/2013 | Hegde et al. | |
| 8,417,666 B2 | 4/2013 | Bailor et al. | |
| 8,544,069 B1 | 9/2013 | Subbiah et al. | |
| 8,572,712 B2 | 10/2013 | Rice et al. | |
| 8,584,258 B2 | 11/2013 | La Rotonda et al. | |
| 8,611,544 B1 | 12/2013 | Herbach et al. | |
| 8,955,084 B2 | 2/2015 | Do et al. | |
| 9,053,079 B2 | 6/2015 | Bailor et al. | |
| 9,087,208 B2 | 7/2015 | Ibel et al. | |
| 9,207,933 B2 | 12/2015 | Bostick et al. | |
| 9,547,665 B2 | 1/2017 | Wood et al. | |
| 9,977,715 B2 | 5/2018 | Bailor et al. | |
| 2002/0038425 A1 | 3/2002 | Kanno | |
| 2002/0065848 A1 | 5/2002 | Walker et al. | |
| 2003/0079136 A1 | 4/2003 | Ericta et al. | |
| 2003/0110131 A1 | 6/2003 | Alain et al. | |
| 2003/0196087 A1 | 10/2003 | Stringer et al. | |
| 2004/0054628 A1 | 3/2004 | de jong et al. | |
| 2004/0122870 A1 | 6/2004 | Park et al. | |
| 2004/0177343 A1 | 9/2004 | Mcvoy et al. | |
| 2004/0205663 A1 | 10/2004 | Mohamed | |
| 2004/0257610 A1 | 12/2004 | Itoh et al. | |
| 2004/0268187 A1 | 12/2004 | Burke et al. | |
| 2005/0005133 A1 | 1/2005 | Xia et al. | |
| 2005/0071386 A1 | 3/2005 | Wolfgang et al. | |
| 2005/0177617 A1 | 8/2005 | Banginwar et al. | |
| 2005/0234943 A1 | 10/2005 | Clarke | |
| 2005/0251411 A1 | 11/2005 | Ishii et al. | |
| 2005/0278259 A1 | 12/2005 | Gunaseelan et al. | |
| 2006/0080103 A1 | 4/2006 | Van Breemen | |
| 2006/0184673 A1 * | 8/2006 | Liebman | G06F 17/3028 709/225 |
| 2006/0190833 A1 | 8/2006 | SanGiovanni et al. | |
| 2006/0200755 A1 | 9/2006 | Melmon et al. | |
| 2006/0230311 A1 | 10/2006 | Kao et al. | |
| 2006/0259601 A1 * | 11/2006 | Soelberg | H04L 63/08 709/223 |
| 2006/0286536 A1 | 12/2006 | Mohler et al. | |
| 2007/0033637 A1 | 2/2007 | Yami et al. | |
| 2007/0039055 A1 | 2/2007 | Plastina et al. | |
| 2007/0088729 A1 | 4/2007 | Baca et al. | |
| 2007/0130177 A1 | 6/2007 | Schneider et al. | |
| 2007/0168490 A1 | 7/2007 | Kent et al. | |
| 2007/0186157 A1 | 8/2007 | Walker et al. | |
| 2007/0214482 A1 | 9/2007 | Nguyen | |
| 2007/0234215 A1 | 10/2007 | Graham et al. | |
| 2007/0239668 A1 | 10/2007 | Shin et al. | |
| 2007/0283321 A1 | 12/2007 | Hegde et al. | |
| 2008/0115227 A1 | 5/2008 | Toutonghi | |
| 2008/0120196 A1 | 5/2008 | Reed et al. | |
| 2008/0140664 A1 | 6/2008 | Hao et al. | |
| 2008/0140849 A1 * | 6/2008 | Collazo | H04L 29/06027 709/229 |
| 2008/0172607 A1 | 7/2008 | Baer | |
| 2008/0177782 A1 | 7/2008 | Poston et al. | |
| 2008/0189617 A1 | 8/2008 | Covell et al. | |
| 2008/0189646 A1 | 8/2008 | Bohle | |
| 2008/0229211 A1 | 9/2008 | Herberger et al. | |
| 2008/0235579 A1 | 9/2008 | Champion et al. | |
| 2008/0262920 A1 * | 10/2008 | O'Neill et al. | 705/14 |
| 2009/0006946 A1 | 1/2009 | Hanson et al. | |
| 2009/0083266 A1 | 3/2009 | Poola et al. | |
| 2009/0150947 A1 | 6/2009 | Soderstrom | |
| 2009/0187825 A1 | 7/2009 | Sandquist et al. | |
| 2009/0234876 A1 | 9/2009 | Schigel et al. | |
| 2009/0235347 A1 | 9/2009 | Syed et al. | |
| 2009/0248794 A1 | 10/2009 | Helms et al. | |
| 2009/0249224 A1 | 10/2009 | Davis et al. | |
| 2009/0271696 A1 | 10/2009 | Bailor et al. | |
| 2009/0276698 A1 | 11/2009 | Clarke et al. | |
| 2009/0282005 A1 | 11/2009 | Kim et al. | |
| 2009/0319376 A1 | 12/2009 | Mills | |
| 2009/0327294 A1 | 12/2009 | Bailor et al. | |
| 2010/0036967 A1 | 2/2010 | Caine et al. | |
| 2010/0192211 A1 | 7/2010 | Bono et al. | |
| 2010/0198730 A1 | 8/2010 | Ahmed et al. | |
| 2010/0205221 A1 | 8/2010 | Shaw et al. | |
| 2010/0228989 A1 | 9/2010 | Neystadt et al. | |
| 2010/0281074 A1 | 11/2010 | Bailor et al. | |
| 2010/0281093 A1 * | 11/2010 | Poder et al. | 709/201 |
| 2010/0281362 A1 | 11/2010 | Bailor et al. | |
| 2010/0299601 A1 * | 11/2010 | Kaplan et al. | 715/716 |
| 2010/0302015 A1 | 12/2010 | Kipman et al. | |
| 2010/0318611 A1 | 12/2010 | Curtin et al. | |
| 2011/0078775 A1 | 3/2011 | Yan | |
| 2011/0125742 A1 | 5/2011 | Haines et al. | |
| 2011/0167036 A1 | 7/2011 | Liebman | |
| 2011/0173188 A1 | 7/2011 | Walsh et al. | |
| 2011/0173547 A1 | 7/2011 | Lewis et al. | |
| 2011/0202430 A1 | 8/2011 | Narayanan et al. | |
| 2011/0225547 A1 | 9/2011 | Fong et al. | |
| 2011/0269437 A1 | 11/2011 | Marusi et al. | |
| 2011/0302133 A1 | 12/2011 | Kuruganti et al. | |
| 2012/0005237 A1 | 1/2012 | Obata | |
| 2012/0102566 A1 | 4/2012 | Vrancken et al. | |
| 2012/0197419 A1 | 8/2012 | Dhruv et al. | |
| 2012/0204250 A1 | 8/2012 | Anderson et al. | |
| 2012/0216296 A1 | 8/2012 | Kidron | |
| 2012/0317288 A1 * | 12/2012 | Campana et al. | 709/225 |
| 2012/0330736 A1 | 12/2012 | Beckner et al. | |
| 2012/0331529 A1 | 12/2012 | Ibel et al. | |
| 2013/0110832 A1 | 5/2013 | Wood et al. | |
| 2013/0110890 A1 | 5/2013 | Bailor | |
| 2013/0110892 A1 | 5/2013 | Wood et al. | |
| 2013/0151940 A1 | 6/2013 | Bailor et al. | |
| 2013/0191884 A1 | 7/2013 | Leicher et al. | |
| 2014/0129645 A1 | 5/2014 | Mo | |
| 2014/0137232 A1 | 5/2014 | Kobayashi | |
| 2014/0223527 A1 | 8/2014 | Bortz et al. | |

(56) References Cited

U.S. PATENT DOCUMENTS

| | | | |
|---|---|---|---|
| 2015/0143468 | A1 | 5/2015 | Hebert et al. |
| 2015/0150106 | A1 | 5/2015 | Lund et al. |
| 2015/0213443 | A1 | 7/2015 | Geffon et al. |
| 2015/0242597 | A1 | 8/2015 | Danciu |
| 2015/0242897 | A1 | 8/2015 | Dinardo et al. |
| 2015/0269033 | A1 | 9/2015 | Bailor et al. |
| 2015/0310188 | A1 | 10/2015 | Ford et al. |
| 2017/0140658 | A1 | 5/2017 | Aluvala et al. |
| 2018/0089451 | A1 | 3/2018 | Lin |

FOREIGN PATENT DOCUMENTS

| | | | |
|---|---|---|---|
| CN | 102016835 | A | 4/2011 |
| CN | 102110083 | A | 6/2011 |
| CN | 102262620 | A | 11/2011 |
| WO | 9926127 | | 5/1999 |
| WO | 2009061638 | A1 | 5/2009 |
| WO | 2009079116 | A2 | 6/2009 |
| WO | 2011102825 | A1 | 8/2011 |

OTHER PUBLICATIONS

Enable Anonymous Access, Retrieved at <<http://office.microsoft.com/en-us/windows-sharepoint-services-help/enable-anonymous-access-HA010113018.aspx#BMenablelistlibrary>>, Dec. 1, 2011, pp. 3.
One True Media, Retrieved at <<http://bcpslibraryinformationservices.pbworks.com/w/page/12773121/One%20True%20Media>>, Retrieved Date: Dec. 5, 2011, pp. 2.
Sharing Users and Content Across Multiple Sites, Retrieved at <<http://drupal.org/node/201673>>, Mar. 19, 2010, pp. 4.
Sohn, et al., "Content Sharing Between Home Networks by Using Personal Information and Associated Fuzzy Vault Scheme", Retrieved at <<http://ieeexplore.ieee.org/stamp/stamp.jsp?arnumber=05174404>>, IEEE Transactions on Consumer Electronics, May 2009, pp. 431-437.
Swift, Mike., "Blekko and Montage let users make Web search more social", Retrieved at <<http://articles.latimes.com/2011/jan/01/business/la-fi-websearch-20110101>>, Jan. 1, 2011, pp. 3.
"First Office Action and Search Report Received for Chinese Patent Application No. 201210419134.8", dated Nov. 25, 2014, 15 Pages.
Office Action received for U.S. Appl. No. 13/528,897, dated Mar. 25, 2015, 31 pages.
Office Action received for U.S. Appl. No. 13/439,126, dated Sep. 22, 2015, 8 pages.
Office Action received for U.S. Appl. No. 13/528,897, dated Mar. 17, 2017, 36 pages.
Office Action received for U.S. Appl. No. 13/439,126, dated Jul. 8, 2016, 9 pages.
"Introduction to Microsoft Sync Framework File Synchronization Provider", Retrieved from: http://msdn.microsoft.com/en-us/sync/bb887623.aspx, Oct. 2009, 6 Pages.
"Offers and Actions", Retrieved from: https://msdn.microsoft.com/en-usllibrary/cc287684.aspx, Retrieved on: Aug. 8, 2016, 3 Pages.
"Skip undo step in Vim", Retrieved from: http://stackoverflow.com/questions/5773292/skip-undo-step-in-vim, Retrieved on: Jul. 4, 2011, 2 Pages.

"Final Office Action Issued in U.S. Appl. No. 13/316,763", dated Feb. 19, 2014, 19 Pages.
"Non Final Office Action Issued in U.S. Appl. No. 13/316,763", dated Jun. 26, 2014, 7 Pages.
"Non Final Office Action Issued in U.S. Appl. No. 13/316,763", dated Jun. 10, 2013, 18 Pages.
"Final Office Action Issued in U.S. Appl. No. 13/439,126", dated Feb. 28, 2014, 12 Pages.
"Non Final Office Action Issued in U.S. Appl. No. 13/439,126", dated Jul. 19, 2013, 12 Pages.
"Final Office Action Issued in U.S. Appl. No. 13/528,897", dated Nov. 8, 2016, 32 Pages.
"Final Office Action Issued in U.S. Appl. No. 13/528,897", dated Aug. 11, 2015, 32 Pages.
"Final Office Action Issued in U.S. Appl. No. 13/528,897", dated Jun. 27, 2018, 33 Pages.
"Non-Final Office Action Issued in U.S. Appl. No. 13/528,897", dated Apr. 22, 2016, 32 Pages.
"Non-Final Office Action Issued in U.S. Appl. No. 13/528,897", dated Oct. 6, 2017, 32 Pages.
"Non Final Office Action Issued in U.S. Appl. No. 14/709,819", dated Aug. 17, 2017, 23 Pages.
"International Search Report and Written Opinion Issued in PCT Application No. PCT/US2017/051682", dated Nov. 22, 2017, 10 Pages.
"Non Final Office Action Issued in U.S. Appl. No. 15/274,367", dated Sep. 20, 2018, 26 Pages.
"Final Office Action Issued in U.S. Appl. No. 15/274,367", dated Apr. 16, 2019, 39 Pages.
"Second Office Action and Search Report Issued in Chinese Patent Application No. 201210419134.8", dated Jul. 1, 2015, 11 Pages.
"First Office Action and Search Report Issued in Chinese Patent Application No. 201210532091.4", dated Oct. 10, 2014, 12 Pages.
"Fourth Office Action and Search Report Issued in Chinese Patent Application No. 201210532091.4", dated Feb. 15, 2016, 10 Pages.
"Second Office Action Issued in Chinese Patent Application No. 201210532091.4", dated Apr. 9, 2015, 8 Pages.
"Third Office Action and Search Report Issued in Chinese Patent Application No. 201210532091.4", dated Aug. 19, 2015, 12 Pages.
Citro, et al., "Conflict Management for Real-Time Collaborative Editing in Mobile Replicated Architectures", School of Computer Science and Information Technology, RMIT University, 2007, 10 Pages.
Gommans, et al., "Token-based Authorization of Connection Oriented Network Resources", In Proceedings of 1st International Workshop on Networks for Grid Applications, Oct. 29, 2004, 8 Pages.
Hodges, Buck, "Team Foundation Power Toys", Retrieved from: https://web.archive.org/web/20110407152119/http://blogs.msdn.com/b/buckh/archive/2005/11/16/493401.aspx, Nov. 16, 2005, 6 Pages.
Machulak, et al., "User-Managed Access to Web Resources", In Proceedings of the 6th ACM workshop on Digital Identity Management, Mar. 2010, 12 Pages.
Mackenzie, Neil, "Permissions in Azure DocumentDB", Retrieved from: https://blogs.msdn.microsoft.com/cloud_solution_architect/2014/12/09/permissions-in-azure-documentdb/, Dec. 9, 2014, 4 Pages.
Meier, et al. "Guidelines: Source Control", Retrieved from: https://web.archive.org/web/20081231065412/http://msdn.microsoft.com/en-us/library/bb668944.aspx, Sep. 2007, 30 Pages.

* cited by examiner

200

RECEIVE A REQUEST TO ASSOCIATE A MEDIA FILE WITH A DOCUMENT
202

RETRIEVE A FIRST LINK TO A NETWORK STORAGE LOCATION FOR THE MEDIA FILE
204

DETERMINE THE FIRST LINK DOES NOT PERMIT ACCESS TO THE NETWORK STORAGE LOCATION FOR THE MEDIA FILE BY A DOCUMENT RECIPIENT
206

DETERMINE WHETHER A SECOND LINK TO THE NETWORK STORAGE LOCATION FOR THE MEDIA FILE IS AVAILABLE THAT DOES PERMIT ACCESS BY THE DOCUMENT RECIPIENT
208

ASSOCIATE THE SECOND LINK WITH THE DOCUMENT WHEN THE SECOND LINK IS AVAILABLE
210

```
┌─────────────────────────────────────────────┐
│ DETERMINE THE SECOND LINK TO THE NETWORK STORAGE │
│   LOCATION FOR THE MEDIA FILE IS NOT AVAILABLE   │
│                     302                          │
└─────────────────────────────────────────────┘
                       │
┌─────────────────────────────────────────────┐
│ DETERMINE PERMISSIONS FOR THE NETWORK STORAGE │
│ LOCATION CAN BE MODIFIED TO PERMIT ACCESS BY THE │
│              DOCUMENT RECIPIENT                  │
│                     304                          │
└─────────────────────────────────────────────┘
                       │
┌─────────────────────────────────────────────┐
│  MODIFY PERMISSIONS FOR THE NETWORK STORAGE     │
│ LOCATION TO PERMIT ACCESS BY THE DOCUMENT       │
│                 RECIPIENT                        │
│                     306                          │
└─────────────────────────────────────────────┘
                       │
┌─────────────────────────────────────────────┐
│ RETRIEVE A THIRD LINK TO THE NETWORK STORAGE    │
│  LOCATION WITH THE MODIFIED PERMISSIONS          │
│                     308                          │
└─────────────────────────────────────────────┘
                       │
┌─────────────────────────────────────────────┐
│   ASSOCIATE THE THIRD LINK WITH THE DOCUMENT    │
│                     310                          │
└─────────────────────────────────────────────┘
```

```
┌─────────────────────────────────────────────┐
│ DETERMINE PERMISSIONS FOR THE NETWORK STORAGE│
│ LOCATION CANNOT BE MODIFIED TO PERMIT ACCESS BY│
│         THE DOCUMENT RECIPIENT              │
│                    402                      │
└─────────────────────────────────────────────┘
                      │
┌─────────────────────────────────────────────┐
│ DETERMINE THE MEDIA FILE CAN BE RETRIEVED FROM│
│         THE NETWORK STORAGE LOCATION        │
│                    404                      │
└─────────────────────────────────────────────┘
                      │
┌─────────────────────────────────────────────┐
│ RETRIEVE THE MEDIA FILE FROM THE NETWORK STORAGE│
│                  LOCATION                   │
│                    406                      │
└─────────────────────────────────────────────┘
                      │
┌─────────────────────────────────────────────┐
│  SEND THE MEDIA FILE TO A NEW NETWORK STORAGE│
│ LOCATION THAT DOES PERMIT ACCESS BY THE DOCUMENT│
│                  RECIPIENT                  │
│                    408                      │
└─────────────────────────────────────────────┘
                      │
┌─────────────────────────────────────────────┐
│ RECEIVE A FOURTH LINK TO THE NEW NETWORK STORAGE│
│         LOCATION FOR THE MEDIA FILE         │
│                    410                      │
└─────────────────────────────────────────────┘
                      │
┌─────────────────────────────────────────────┐
│      ASSOCIATE THE FOURTH LINK TO THE DOCUMENT│
│                    412                      │
└─────────────────────────────────────────────┘
```

FIG. 4

TECHNIQUES TO SHARE MEDIA FILES

BACKGROUND

Files can be shared using myriad different technologies. For instance, message applications are designed to communicate messages between multiple devices. One of the many advantages of message applications is the capability to communicate files as message attachments. For instance, media files such as images, photographs and videos on one computing device may be attached to a message and transported to other computing devices. However, using message applications to send attachments is highly inefficient in that they need to make multiple copies of a media file, such as one for the attachment and one for each device receiving the attachment. Media files are relatively large and consume significant amounts of processing and communications resources, and therefore copying is an expensive operation. Prior solutions attempt to reduce copying by using links, such as a universal resource locator (URL) to a network storage device. However, many times links cannot be used to access media files stored in non-public storage locations. These and other limitations inhibit users from efficiently sharing media files using existing solutions. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to share media files. Some embodiments are particularly directed to techniques to share media files using an iterative file share approach to coalesce multiple different types of media sharing techniques in an innovative manner to reduce an overall number of file copies needed to share the media files.

In one embodiment, for example, an apparatus may comprise a processor and a memory communicatively coupled to the processor. The memory may store an application having a media share component operative to share a media file among a defined set of users. The media share component may comprise multiple software modules, including a file manager module and a file reference module. The file manager module may be operative to determine a network storage location for the media file. The file reference module may be operative to automatically generate a valid link to the network storage location for the media file. The valid link may be specifically arranged to permit access to the network storage location for the media file by the defined set of users of the application. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 2 illustrates an embodiment of a logic flow for a media sharing component of the media sharing system testing a link to a media file.

FIG. 3 illustrates an embodiment of a logic flow for a media sharing component of the media sharing system modifying permissions for a network storage location of a media file.

FIG. 4 illustrates an embodiment of a logic flow for a media sharing component of the media sharing system copying a media file to a new storage location.

DETAILED DESCRIPTION

Various embodiments are directed to techniques for enhanced media file sharing techniques to effectively and efficiently allow electronic systems and devices to communicate and share media files using different message applications or modalities. The enhanced media file sharing techniques may automatically or programmatically use an iterative file share approach specifically designed to simplify user operations and reduce a number of file copies needed to share the media files. The iterative file share approach may utilize an array of file share techniques, such as generating different types of links, testing different types of links, modifying permissions for network storage locations, and finally copying media files to new network storage locations. The iterative file share approach utilizes file copies as a last resort only after all other file share techniques have been tested and failed. In this manner, the iterative file share approach reduces, or in some cases eliminates, the need to make file copies to share a media file among multiple users, thereby conserving computing and communications resources for a device or network. Furthermore, the iterative file share approach is performed without any manual intervention needed by a user performing the file share, thereby resulting in an improved user experience when sharing media files. As a result of these and other advantages, the embodiments can improve affordability, scalability, modularity, extendibility, or interoperability for an operator, device or network.

Figure 1:
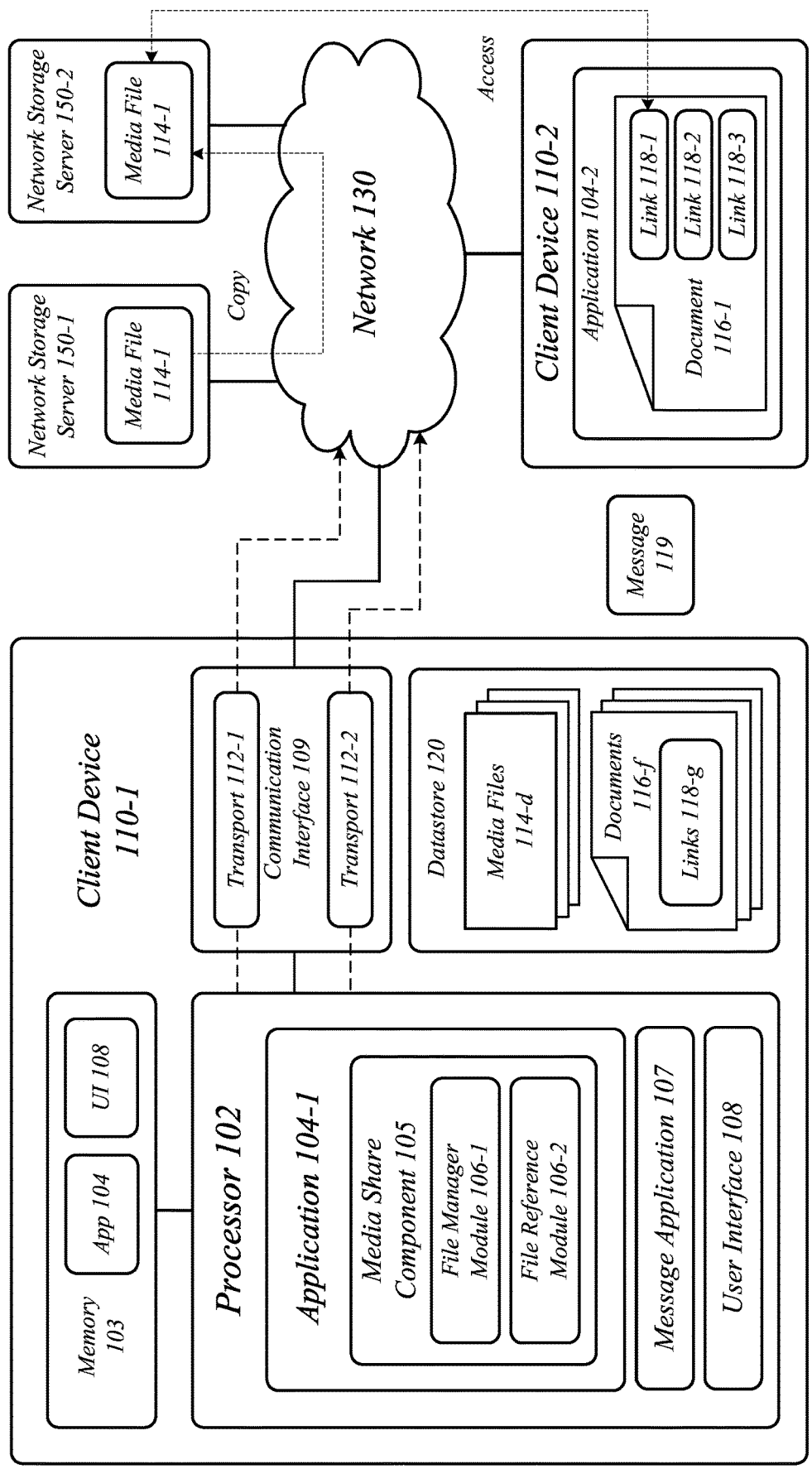
FIG. 1 illustrates an embodiment of a media sharing system.

FIG. 1 illustrates a block diagram for a media sharing system 100 suitable for implementing one or more enhanced media file sharing techniques to effectively and efficiently allow electronic systems and devices to communicate and share media files. The media files may be shared using different communications techniques, such as through utilizing various message applications, social networking system (SNS) feeds, publishing techniques, or other public or private distribution modalities.

In various embodiments, the media sharing system 100 may comprise a computer-implemented system having multiple types of networks and devices composed of multiple hardware and software components. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the media sharing system 100 may comprise multiple client devices 110-a, shown in FIG. 1 as client devices 110-1, 110-2, and multiple network storage servers 150-b, shown in FIG. 1 as network storage servers 150-1, 150-2, all communicating over a network 130. Although the media sharing system 100 as shown in FIG. 1 has a limited number of elements in a certain topology, it may be appreciated that the media sharing system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of client devices 110-a may include client devices 110-1, 110-2, 110-3, 110-4 and 110-5. The embodiments are not limited in this context.

The media sharing system 100 may include multiple client devices 110-a. The client devices 110-a may comprise any electronic devices having both computing and communications capabilities. The communications capabilities may include both wired and wireless communications capabilities. Examples of an electronic device may include without limitation a computing device, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The client devices 110-a may each comprise a processor 102 and a memory 103 communicatively coupled to the processor 102. The processor 102 and the memory 103 may each be communicatively coupled to a communication interface 109. An exemplary architecture and examples for client devices 110-a may be described with reference to FIG. 11.

The client devices 110-a may each implement one or more productivity applications 104-c, shown in FIG. 1 as productivity applications 104-1, 104-2 for client devices 110-1, 110-2, respectively. A productivity application 104-c may comprise a software application program designed to perform a specific set of functions for a knowledge worker. A productivity application 104-c typically operates to create, modify, send, receive, or otherwise manage content for one or more documents 116-f. Examples for productivity applications 104-c may include without limitation a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for productivity applications 104-c may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples. It also is to be appreciated that the client devices 110-a may each implement other types of applications in addition to productivity applications 104-c which are consistent with the described embodiments.

In one embodiment, the client devices 110-a may implement a productivity application 104-c such as a montage application. A montage may comprise an aggregation of separate elements to form a single composite element. For instance, a montage may comprise a composite picture made up of several separate pictures, or a video sequence comprising a rapid sequence of disparate images. A montage may comprise a singular composite or aggregation of digital information elements from selected content files to form a single composite digital information element. A montage may comprise, for example, a composite document having different constituent digital information elements generated by heterogeneous applications, such as applications files for application programs. Sometimes the constituent digital information elements are organized according to a central theme, such as those digital information elements relating to a business project, personal vacation, or a holiday. Often, the constituent digital information elements are lower-fidelity representations of the actual content files due to space limitations of the composite document. As such, a content consumer may select a constituent digital information element to retrieve a higher-fidelity version of the associated content file for more in-depth viewing.

As shown in FIG. 1, for example, the client devices 110-1, 110-2 implement respective applications 104-1, 104-2. The applications 104-1, 104-2 may generally operate to generate, send, receive, update, modify and otherwise manage documents 116-*f* for the client devices 110-1, 110-2. It may be appreciated that the implementation details shown for the client device 110-1 and its application 104-1 as described herein also applies to the client device 110-2 and its respective application 104-2.

In one embodiment, the applications 104-1, 104-2 are implemented as stand-alone client-based applications stored and executed by local resources provided by the client devices 110-1, 110-2, such as the processor 102 and the memory 103 of the client device 110-1 In one embodiment, the applications 104-1, 104-2 are implemented as cloud computing applications which are network based applications implemented on network devices and accessed by the client devices 110-1, 110-2 via a web browser or thin-client application programs. In one embodiment, the applications 104-1, 104-2 may comprise distributed applications suitable for distributed processing and partially executing on local resources for the client devices 110-1, 110-2 and partially executing on network resources. The embodiments are not limited in this context.

The productivity applications 104-*c* may be accessed and manipulated by a user interface, such as a user interface 108. A user interface is a system by which people (users) interact with an electronic device, such as a computer. In general, the user interface 108 allows users to input information to manipulate an electronic device. A user interface 108 also allows an electronic device to output information as to the effects of the manipulation. In computing, a graphical user interface (GUI) is a type of user interface that allows users to interact with electronic devices with images rather than text commands. A GUI represents the information and actions available to a user through graphical icons and visual indicators such as secondary notation, as opposed to text-based interfaces, typed command labels or text navigation. The actions are usually performed through direct manipulation of the graphical elements. The user interface 108 may generally provide a user interface, such as a GUI engine, for the productivity application 104-1. The user interface 108 may be implemented natively as part of the productivity application 104-1, or as part of another software program, such as an operating system (OS) or other system program.

The productivity applications 104-*c*, as shown for the productivity application 104-1 of the client device 110-1, may have a media share component 105 operative to share one or more media files 114-*d*, such as a media file 114-1, among a defined set of users. The media share component 105 may comprise multiple modules 106-*e*, such as a file manager module 106-1 and a file reference module 106-2. The file manager module 106-1 may determine a network storage location for the media file 114-1. The file reference module 106-2 may automatically generate a valid link 118-*g* to a network storage location for the media files 114-*d*, such as a valid link 118-1 for the media file 114-1, the valid link 118-1 specifically arranged to permit access to the network storage location for the media file 114-1 by the defined set of users of the applications 104-1, 104-2.

The media files 114-*d* may comprise any type of multimedia file of a given media file format storing content accessible by the application 104-1. Examples for a media file 114-*d* include without limitation text, audio, still images, photographs, graphics, animation, video, movies, audio/video, interactive content, application files, hypermedia, gaming files, computer-aided design (CAD) files, database files, documents, application files, map files, graphic information system files, program code, and any other types of media content consistent with the described embodiments. In one embodiment, for example, the media file 114-*d* may comprise an image such as a photograph. Some examples of media file formats for images may include without limitation the image extensions "JPG", "JPEG", "GIF", "PNG", "BMP", "TIFF", "TIF", "ICO", "DIB", and so forth. In one embodiment, for example, the media file 114-*d* may comprise a video such as a movie. Some examples of media file formats for video may include without limitation Windows Media® Video (WMV), Moving Picture Experts Group (MPEG) Phases 1-4, QuickTime (MOV), and so forth. The embodiments are not limited to any given media type or media format for the media file 114-*d*.

The media share component 105 may share one or more media files 114-*d* among a defined set of users. A defined set of users may include any number of users enumerated on a list and authorized to access the media files 114-*d*. One example of a defined set of users may include users having access to applications 104-1, 104-2. Another example of a defined set of users may include users receiving a document 116-*f* created or modified by one of the applications 104-1, 104-2. An example of a defined set of users may include a distribution list for recipients of a message 119 with a document 116-*f* with which a set of media files 114-*d* are associated. Other examples of a defined set of users may include a social group of friends in a SNS, a work group in a business entity, subscribers to a publication service, and any other discrete set of users. The embodiments are not limited in this context.

The file manager module 106-1 may determine a network storage location for a media file 114-*d* that is shared by a defined set of users. A network storage location may comprise a network address for a media file 114-*d* stored by a network device, such as a network storage server 150-*b*, or simply an address for a network device. Examples of a network address may include a universal resource locator (URL), Internet Protocol (IP) address, network proxy address, media access control (MAC) address, or some other form of network address. In one embodiment, the file manager module 106-1 may determine a network storage location for the media file 114-1 by initially determining whether a media file 114-1 is a local media file or a remote media file.

A local media file is when the media file 114-1 is stored on a same device as the application 104-1, such as the datastore 120, for example. In this case, the file manager module 106-1 may issue control directives to retrieve the media file 114-1, and send the media file 114-1 to a network storage server 150-1. The file manager module 106-1 may then forward the network storage location to the file reference module 106-2 for processing.

A remote media file is when the media file 114-1 is stored on a different device as the application 104-1, such as the network storage server 150-1. In this case, the file manager module 106-1 may retrieve the current network storage location for the media file 114-1, and forward the network storage location to the file reference module 106-2 for processing.

In either case, the file reference module 106-2 may receive a current network storage location for the media file 114-1, and automatically generate a valid link 118-*g* to a network storage location for the media files 114-*d*, such as a valid link 118-1 for the media file 114-1. The valid link 118-1 is any type of link that provides a reference to the media file 114-1 as stored at the network storage location that is specifically arranged to permit access to the network storage location for the media file 114-1 by a defined set of users for the application 104-1.

Each of the links 118-g may comprise a reference or pointer to stored media files 114-d that a user can directly follow, or that is followed automatically by a program. References are data types that refer to a referent (e.g., stored media files 114-d such as an object, file, data item, and so forth) elsewhere in memory of a device (e.g., a file server) and are used to access the referent. Generally, a reference is a value that enables a program to directly access the referent. The referent may be stored on a same device as the reference or a different device as the reference. Most programming languages support some form of reference. Examples for the links 118-g may include without limitation hypertext and hyperlinks, such as those used by the World Wide Web (WWW). Hypertext is text with hyperlinks. A hyperlink typically comprises an anchor, which is a location within a message from which the hyperlink can be followed. The target of a hyperlink is the stored media file 114-d to which the hyperlink leads. The user can follow the link when its anchor is shown by activating it in some way, such as by touching it (e.g., with a touch screen display) or clicking on it with a pointing device (e.g., a mouse). When a link 118-g is activated its target (e.g., the media file 114-d) is displayed, typically via a web browser.

In some cases, however, a link 118-g may comprise an invalid link. An invalid link does not allow a user to access a media file 114-d. For instance, a media file 114-d may be stored in a private (non-public) location having a set of permissions that prevent some users from gaining access to the media file 114-d. In other cases, a network storage location for the media file 114-d may have changed without corresponding updates to the link 118-g. In still other cases, a network storage server 150-1, 150-2 may be inoperable, or a communications link of network 130 to the network storage server 150-1, 150-2 may be severed or overloaded.

The file reference module 106-2 may automatically or programmatically use an iterative file share approach to generate a valid link 118-g specifically designed to simplify user operations and reduce a number of file copies needed to share the media file 114-1. The file reference module 106-2 may utilize an array of file share techniques in a given sequence, such as generating different types of links 118-g, testing different types of links 118-g, modifying permissions for network storage locations, and finally copying media files 114-d to new network storage locations. The file reference module 106-2 utilizes file copies as a last resort only after all other file share techniques have been tested and failed.

The file reference module 106-2 may initiate an iterative file share algorithm that begins by retrieving a current link 118-1 for a network storage location, such as a network storage server 150-b, for a media file 114-1. The network storage servers 150-b may comprise or employ one or more server computing devices and/or server programs that operate to perform various methodologies in accordance with the described embodiments. For example, when installed and/or deployed, a server program may support one or more server roles of the server computing device for providing certain services and features. Exemplary network storage servers 150-b may include, for example, stand-alone and enterprise-class server computers operating a server OS such as a MICROSOFT OS, a UNIX OS, a LINUX OS, or other suitable server-based OS. Exemplary server programs may include, for example, network storage server programs such as MICROSOFT® LIVE providing online network storage of documents and files, including multimedia or media files such as images, photographs, photo albums, videos, video albums, and so forth. Exemplary server programs may further include, for example, network application programs such as social networking application programs, search applications, document management programs, weblogs (blogs), word processing programs, spreadsheet programs, database programs, drawing programs, document sharing programs, message applications, web services, web applications, web server, and/or other types of programs, applications, or services in accordance with the described embodiments.

The file reference module 106-2 may determine whether the current link 118-1 permits access to the network storage location, such as network storage server 150-1, for the media file 114-1 by a defined set of users of the application 104-1. When the current link 118-1 is not accessible by the defined set of users, the file reference module 106-2 attempts to generate a valid link 118-2 that permits access to the network storage location for the media file 114-1 by the defined set of users.

When the file reference module 106-2 determines that the current link 118-1 is not accessible, the file reference module 106-2 may attempt to retrieve a reference such as a universal resource locator (URL) that enables anyone with access to the URL to access the media file 114-1. In one embodiment, for example, the file reference module 106-2 may retrieve a tokenized anonymous view URL for the network storage location from the network storage server 150-1. If successful, the file reference module 106-2 may generate the valid link 118-2 as a reference comprising the tokenized anonymous view URL.

When the file reference module 106-2 determines that a tokenized anonymous view URL is not available, the file reference module 106-2 may next attempt to modify permissions for the network storage location of the media file 114-1 at the network storage server 150-1. If successful, the file reference module 106-2 may generate the valid link 118-2 as a reference to the network storage location of the media file 114-1 after permissions have been modified for the network storage location.

When the file reference module 106-2 determines that permissions for the network storage location cannot be modified, the file reference module 106-2 may next attempt to copy the media file 114-1 from the network storage location of the network storage server 150-1 to a different network storage location that permits access to the media file by the defined set of users, such as network storage server 150-2. If a copy operation is successful, the file reference module 106-2 may generate the valid link 118-2 as a reference to the different network storage location on the network storage server 150-2 for the copied media file 114-1.

Although in some embodiments the file reference module 106-2 is arranged to automatically attempt to change permissions or perform copy operations without manual intervention, such as user input, in other embodiments the file reference module 106-2 may solicit user input by utilizing the user interface 108 to generate various GUI views advising a user of potential options, and receiving user control directives as to selection of a desired option. The embodiments are not limited in this context.

Once the valid link 118-2 is generated, the application 104-1 may associate the valid link 118-2 with a document 116-1. A user and/or the application 104-1 may initiate distribution operations for the document 116-1 and the valid link 118-2 to distribute the document 116-1 and the valid link 118-2 to a set of document recipients as the defined set of users.

In one embodiment, for example, the application may publish the document 116-1 and the valid link 118-2 as part of online user account, such as for a SNS application. Examples of user accounts may include online storage or social networking services, including without limitation MICROSOFT LIVE, MYSPACE™, FACEBOOK™, LINKEDIN™, TWITTER™, BEBO™, and other online storage or social networking services consistent with the described embodiments. The embodiments are not limited in this context.

In one embodiment, for example, the application may send the document 116-1 and the valid link 118-2 as part of a message 119 using a message application 107. The client devices 110-*a* may each implement one or more message applications 107-*h* arranged to communicate various types of messages in a variety of formats. Each of the message applications 107-*h* may be representative of a particular kind of transport, enabling handling of messages of particular types and formats for the particular application. The message applications 107-*h* may comprise without limitation a facsimile application, a video message application, an instant messaging (IM) application, a chat application, an electronic mail (email) application, a short message service (SMS) application, a multimedia message service (MMS) application, a social network system (SNS) application, and so forth. It is to be understood that the embodiments are not limited in this regard and that the message applications 107-*h* may include any other type of messaging or communications application which is consistent with the described embodiments.

The client devices 110-*a* may communicate various types of messages 119 in a variety of formats over the network 130. The various systems and devices shown as part of the media sharing system 100 may be communicatively coupled via various types of communications media, such as a wired and/or wireless network. Similarly, components for a given system or device may coordinate operations between each other. The coordination may involve the uni-directional or bi-directional exchange of information. For instance, certain components may communicate information in the form of signals communicated over a communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. Specific communication techniques suitable for certain embodiments may be described with reference to FIG. 12.

The network 130 may represent a communications framework designed to communicate information between the various devices of the media sharing system 100. The network 130 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

The client devices 110-*a* may communicate media files 114-*d* and or messages 119 using a communications interface 109. The communications interface 109 may comprise or implement various communication techniques to allow the client devices 110-*a* to communicate with each other and the other devices of the media sharing system 100 via the network 130. For instance, the various devices of the media sharing system 100 may each include a communication interface 109 that implements various types of standard communication elements designed to be interoperable with the network 130, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the communications interface 109 may comprise multiple different types of transports 112-*p*, shown in FIG. 1 as transports 112-1, 112-2. Each of the transports 112-*p* may implement or utilize a same or different set of communication parameters to communicate information between the various devices of the media sharing system 100. In one embodiment, for example, each of the transports 112-*p* may implement or utilize a different set of communication parameters to communicate information between the client devices 110-*a* and the message server 140. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the communications interface 109 implemented by the client devices 110-*a*. The embodiments are not limited in this context.

In various embodiments, the communications interface 109 of the client device 110-1 may implement different communication parameters offering varying bandwidths or communications speeds. For instance, the transport 112-1 may comprise a high-speed interface implementing suitable communication parameters for high-speed communications of information to the message server 140, while the transport 112-2 may comprise a low-speed interface implementing suitable communication parameters for lower-speed communications of information to the message server 140.

With respect to wired communications, for example, the transport 112-1 may comprise a network interface designed to communicate information over a packet-switched network such as the Internet. The transport 112-1 may be arranged to provide data communications functionally in accordance with different types of wired network systems or protocols. Examples of suitable wired network systems offering data communication services may include the Internet Engineering Task Force (IETF) Transmission Control Protocol (TCP) and the Internet Protocol (IP) suite of communications standards, the User Datagram Protocol (UDP), the Datagram Congestion Control Protocol (DCCP), the Stream Control Transmission Protocol (SCTP), the Resource Reservation Protocol (RSVP), the Explicit Congestion Notification (ECN) protocol, the Open Shortest Path First (OSPF) suite of protocols, Reliable Transport Protocol (RTP), the IETF Real-Time Transport Protocol (RTP), and so forth. The transport 112-2 may be arranged to provide data communications in accordance with different message protocols, such as the Simple Mail Transfer Protocol (SMTP), extended SMTP (ESMTP), Post Office Protocol (POP), POP3, the Internet Message Access Protocol (IMAP), Multipurpose Internet Mail Extensions (MIME) protocol, Unix-to-Unix Copy (UUCP) protocol, the International Telecommunication Union (ITU) suite of protocols such as the ITU-T X.400 protocol, and so forth. It may be appreciated that other wired communications techniques may be implemented, and the embodiments are not limited in this context.

With respect to wireless communications, for example, the transport 112-1 may comprise a radio designed to communicate information over a wireless local area network (WLAN). The transport 112-1 may be arranged to provide data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The transport 112-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. It may be appreciated that other wireless techniques may be implemented, and the embodiments are not limited in this context.

In various embodiments, the communications interface 109 of the client device 110-1 may implement a same set of communication parameters offering identical or substantially similar bandwidths or communications speeds. However, the transports 112-1, 112-2 may be utilized by the application 104-1 at different points in time. In one embodiment, for instance, the application 104-1 may communicate the one or more media files 114-d during a first time interval, and a message 119 with information pertaining to the one or more media files 114-c (e.g., a link 118-g) during a second time interval. In one embodiment, for example, the first and second time intervals may be completely discontinuous, where a start time and an end time for the first time interval are before a start time for the second time interval. In one embodiment, for example, the first and second time intervals may be partially overlapping, where a start time for the first time interval is before a start time for the second time interval but the end time for the first time interval is after the start time for the second time interval. The embodiments are not limited in this context.

Operations for the above-described embodiments may be further described with reference to one or more logic flows.

It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 2 illustrates one embodiment of a logic flow 200. The logic flow 200 may be representative of some or all of the operations executed by one or more embodiments described herein. For instance, the logic flow 200 may be representative of some or all of the operations executed by the applications 104-1, 104-2 implemented for the respective client devices 110-1, 110-2. In particular, the logic flow 200 may illustrate operations for the media share component 105 in a first iteration of an iterative file share algorithm.

In the illustrated embodiment shown in FIG. 2, the logic flow 200 may receive a request to associate a media file with a document at block 202. The user interface 108 may generate a GUI view allowing a user to create or edit a document 116-1 using the productivity application 104-1. For instance, the document 116-1 may comprise a montage for a montage productivity application. A montage may comprise a singular composite or aggregation of digital information elements from selected content files to form a single composite digital information element. Examples of content files may include media files 114-d. When authoring a montage, a user may associate a media file 114-1 with the document 116-1.

The logic flow 200 may retrieve a first link to a network storage location for the media file at block 204. For instance, assume the file manager module 106-1 of the media share component 105 determines that a media file 114-1 associated with the document 116-1 is located in a local datastore, such as the datastore 120 of the client device 110-1. In this case, the file manager module 106-1 may communicate the media file 114-1 over a high-speed transport 112-1 of the communication interface 109 to the network storage server 150-1 via the network 130. The file manager module 106-1 may then notify the file reference module 106-2 to retrieve a first link 118-1 to a network storage location for the media file 114-1 from the network storage server 150-1. Alternatively, assume the file manager module 106-1 determines that a media file 114-1 associated with the document 116-1 is already stored by the network storage server 150-1. The file manager module 106-1 may notify the file reference module 106-2 to retrieve a first link 118-1 to a network storage location for the media file 114-1 from the network storage server 150-1.

The logic flow 200 may determine the first link does not permit access to the network storage location for the media file by a document recipient at block 206. For instance, the file reference module 106-2 of the media share component 105 may determine the first link 118-1 is an invalid link that does not permit access to the network storage location for the media file by a document recipient. A document recipient may include a user of the client device 110-2 that receives the document 116-1 with the associated media file 114-1. The file reference module 106-2 may test the first link 118-1 to determine it is an invalid link by attempting to access the media file 114-1 using an identifier of the document recipient (e.g., a user name, network address, device address, etc.).

For instance, if the network storage location is a non-public location, such as a user account for a SNS, then the first link 118-1 will fail for a user of the client device 110-2 that does not have permission to access the non-public location.

The logic flow 200 may determine whether a second link to the network storage location for the media file is available that does permit access by the document recipient at block 208. For instance, the file reference module 106-2 may determine that the first link 118-1 is an invalid link, and attempt to retrieve a second link 118-2 to the media access file 114-1 on the network storage device 150-1 that does permit access by the document recipient. Examples of a second link 118-2 may comprise a tokenized anonymous view URL, a link to a public network storage location, and any other valid link.

The logic flow 200 may associate the second link with the document when the second link is available at block 210. For instance, when the file reference module 106-2 determines that a second link 118-2 is available, the file reference module 106-2 may return the second link 118-2 to the productivity application 104-1. The productivity application 104-1 may associate the second link 118-2 with the document 116-1 as a valid link.

FIG. 3 illustrates one embodiment of a logic flow 300. The logic flow 300 may be representative of some or all of the operations executed by one or more embodiments described herein. For instance, the logic flow 300 may be representative of some or all of the operations executed by the applications 104-1, 104-2 implemented for the respective client devices 110-1, 110-2. In particular, the logic flow 300 may illustrate operations for the media share component 105 in a second iteration of the iterative file share algorithm.

In the illustrated embodiment shown in FIG. 3, the logic flow 300 may determine the second link to the network storage location for the media file is not available at block 302. For instance, assume the file reference module 106-2 determines a second link 118-2, such as a tokenized anonymous view URL, is not available.

The logic flow 300 may determine permissions for the network storage location can be modified to permit access by the document recipient at block 304. For instance, the file reference module 106-2 may contact the network storage server 150-1 to determine whether access permissions for the network storage location of the media file 114-1 can be modified to permit access by the document recipient using the client device 110-2.

The logic flow 300 may modify permissions for the network storage location to permit access by the document recipient at block 306. For instance, the file reference module 106-2 may modify permissions for the network storage location of the network storage server 150-1 from private access to public access to permit access by the document recipient using the client device 110-2.

The logic flow 300 may retrieve a third link to the network storage location with the modified permissions at block 308. For instance, the file reference module 106-2 may retrieve a third link 118-3 to the network storage location of the network storage server 150-1 with the modified permissions.

The logic flow 300 may associate the third link with the document at block 310. The file reference module 106-2 may return the third link 118-3 to the productivity application 104-1. The productivity application 104-1 may then associate the third link 118-3 with the document 116-1.

FIG. 4 illustrates one embodiment of a logic flow 400. The logic flow 400 may be representative of some or all of the operations executed by one or more embodiments described herein. For instance, the logic flow 400 may be representative of some or all of the operations executed by the applications 104-1, 104-2 implemented for the respective client devices 110-1, 110-2. In particular, the logic flow 400 may illustrate operations for the media share component 105 in a third iteration of the iterative file share algorithm.

In the illustrated embodiment shown in FIG. 4, the logic flow 400 may determine permissions for the network storage location cannot be modified to permit access by the document recipient at block 402. For instance, the file reference module 106-2 may determine permissions for the network storage location of the network storage server 150-1 cannot be modified to permit access to the media file 114-1 by the document recipient using the client device 110-2.

The logic flow 400 may determine the media file can be retrieved from the network storage location at block 404. For instance, the file reference module 106-2 may contact the network storage server 150-1 to determine whether the media file 114-1 can be downloaded from the network storage location of the network storage server 150-1.

The logic flow 400 may retrieve the media file from the network storage location at block 406. For instance, the file reference module 106-2 may download the media file 114-1 from the network storage location of the network storage server 150-1 to the client device 110-1.

The logic flow 400 may send the media file to a new network storage location that does permit access by the document recipient at block 408. For instance, the file reference module 106-2 may send the media file 114-1 from the client device 110-1 to a new network storage location that does permit access by the document recipient, such as the network storage server 150-2.

The logic flow 400 may receive a fourth link to the new network storage location for the media file at block 410. For instance, the file reference module 106-2 may receive a fourth link 118-4 to the new network storage location of the network storage server 150-2 for the copied version of the media file 114-1.

The logic flow 400 may associate the fourth link to the document at block 412. For instance, the file reference module 106-2 may return the fourth link 118-4 to the productivity application 104-1. The productivity application 104-1 may then associate the fourth link 118-4 with the document 116-1.

Figure 5:
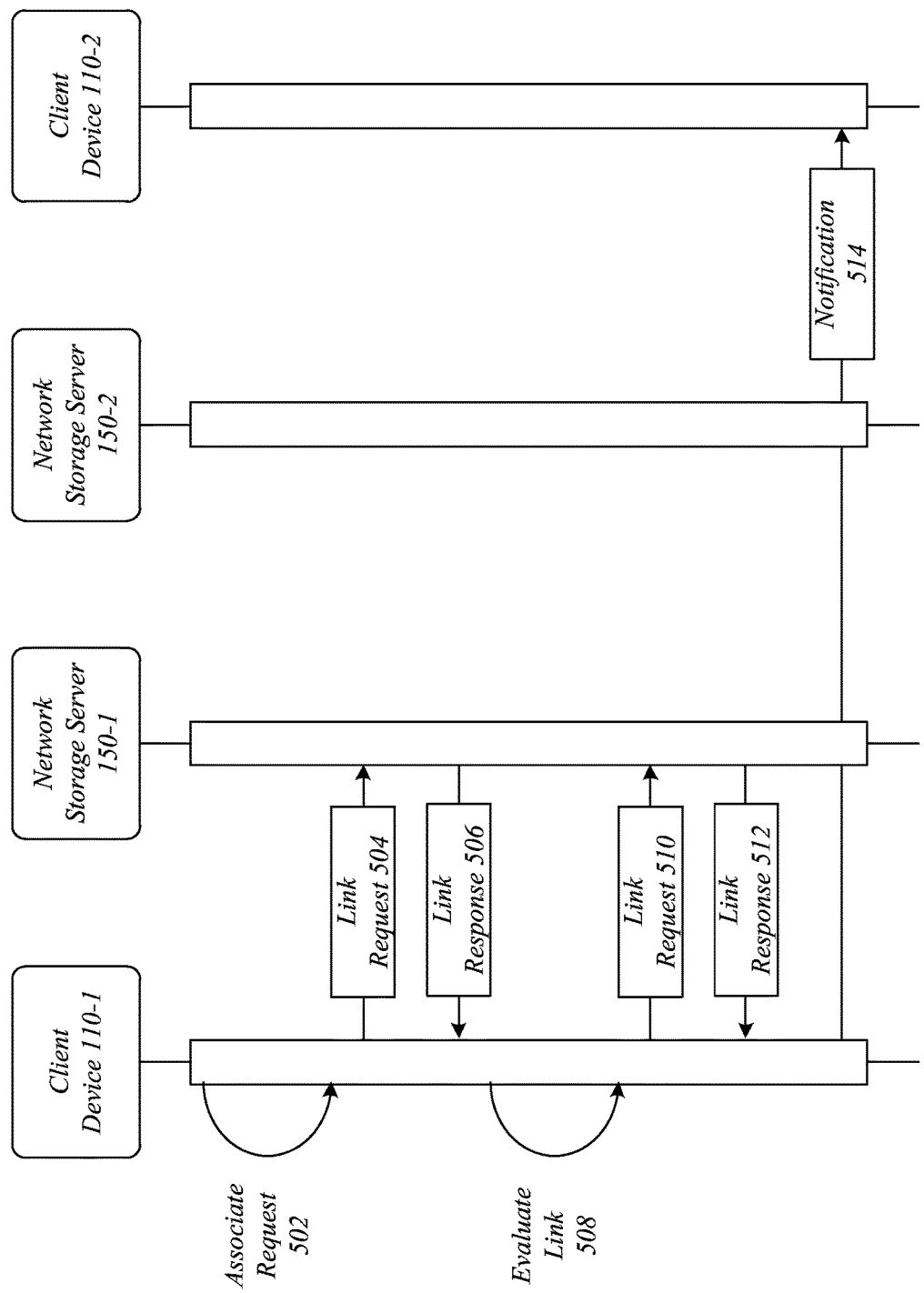
FIG. 5 illustrates an embodiment of a message flow for the media sharing system testing a link to a media file.

FIG. 5 illustrates an embodiment of a message flow 500 for the media sharing system 100 testing a link to a media file 114-d. In the message flow 500, a media share component 105 of the client device 110-1 may receive an associate request 502 to associate a media file 114-1 with a document 116-1. The media share component 105 may cause the client device 110-1 to send a link request 504 to the network storage server 150-1 requesting a link 118-1 to the media file 114-1 stored by the network storage server 150-1. The link request 504 may be sent, for example, using a lower bandwidth transport 112-2 due to the smaller size of the link request 504 relative to the media file 114-1. The network storage server 150-1 may send a link response 506 to the client device 110-1 with the link 118-1. The media share component 105 may perform an evaluate link operation 508 to evaluate the link 118-1 to determine whether it is a valid or invalid link. If the link 118-1 is a valid link, it may be passed to the productivity application 104-1 to embed in the document 116 for use by a user of the client device 110-2 to access the media file 114-1 when viewing the document 116.

In the event the link 118-1 is an invalid link, the media share component 105 may send a link request 510 for a new link 118-2, such as a tokenized anonymous URL, for example. The network storage server 150-1 may determine whether it has a new link 118-2, and if so, sends a link response 512 with the new link 118-2 to the client device 110-1. The media share component 105 may embed the new link 118-2 with the document 116-1, and send a notification message 514 with the document 116-1 and the new link 118-2 to the client device 110-2.

Figure 6:
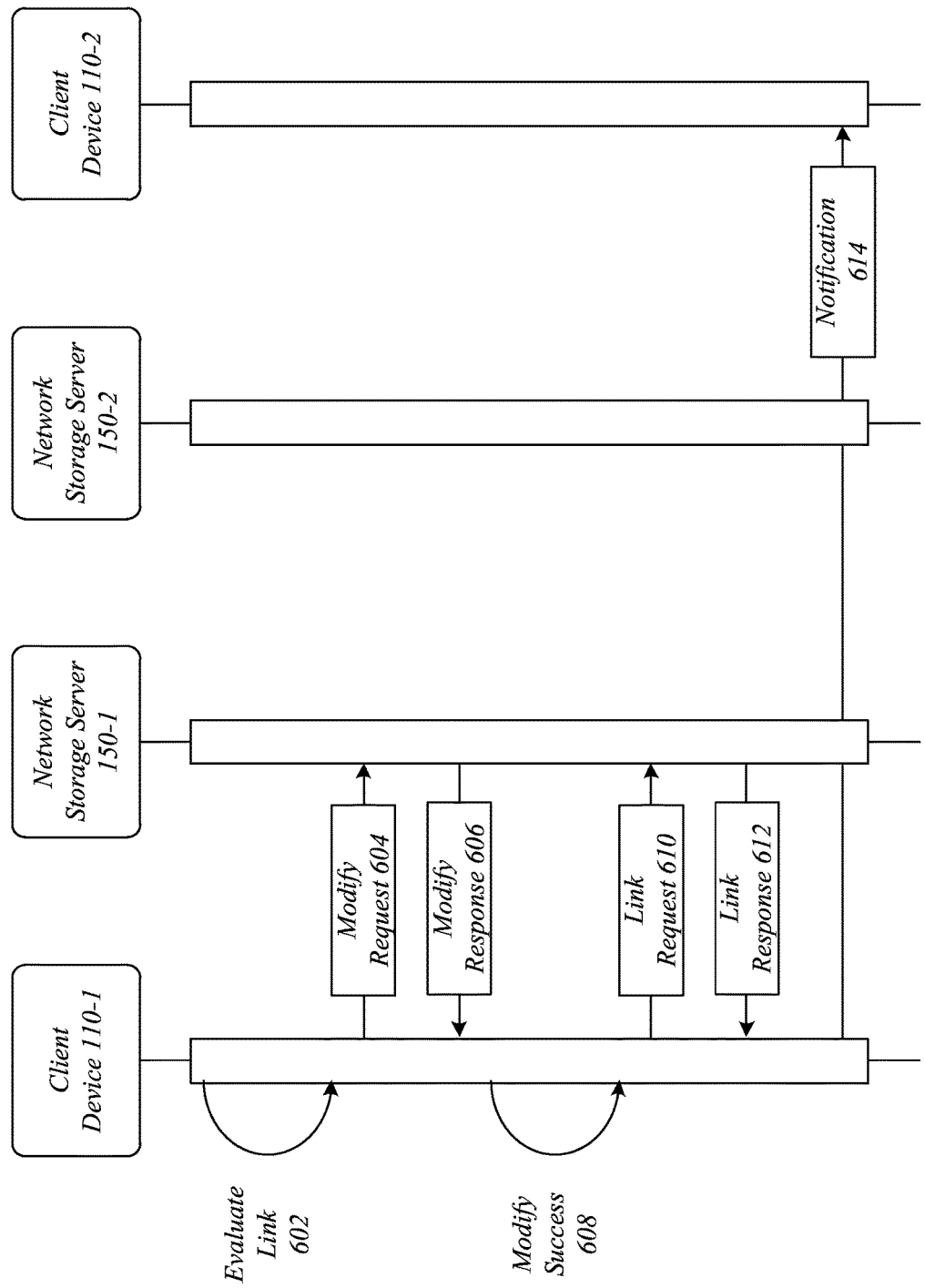
FIG. 6 illustrates an embodiment of a message flow for the media sharing system modifying permissions for a network storage location of a media file.

FIG. 6 illustrates an embodiment of a message flow 600 for the media sharing system 100 modifying permissions for a network storage location of a media file 114-*d*. In the message flow 600, the media share component 105 may perform an evaluate link operation 602 and determine that a new link 118-2 is not available. The media share component 105 may cause the client device 110-1 to send a modify request 604 to modify permissions for the network storage server 150-1 to permit access by a document recipient. The network storage server 150-1 may send a modify response 606 indicating whether permissions may be modified. When the modify response 606 indicates a modify success 608, the media share component 105 may send a link request 610 for a new link 118-3 to access the media file 114-1 at the network storage location with modified permissions to the network storage server 150-1. The network storage server 150-1 may send a link response 612 with the new link 118-3. The media share component 105 may embed the new link 118-3 with the document 116-1, and send a notification message 614 with the document 116-1 and the new link 118-3 to the client device 110-2.

Figure 7:
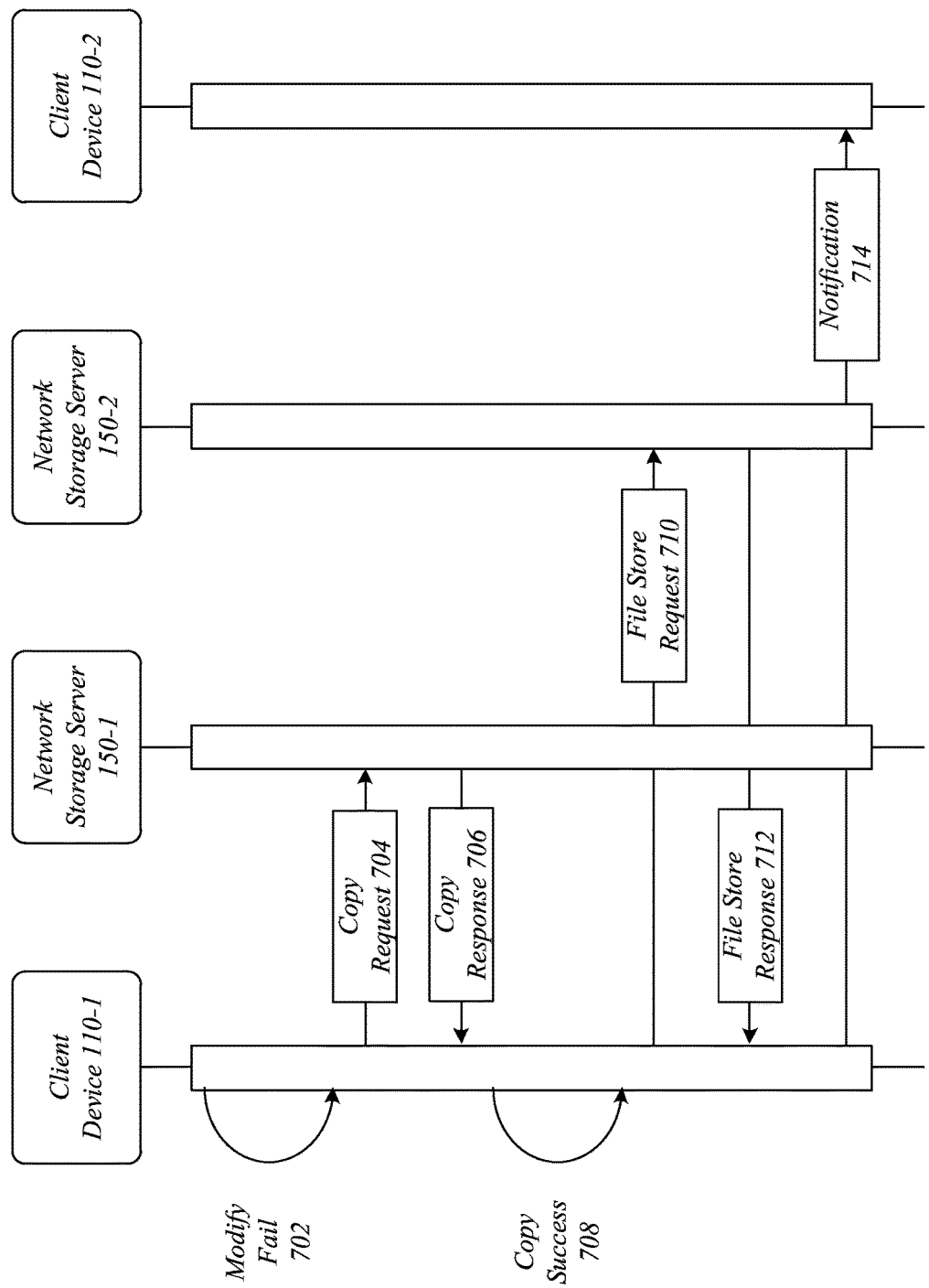
FIG. 7 illustrates an embodiment of a message flow for the media sharing system copying a media file to a new storage location.

FIG. 7 illustrates an embodiment of a message flow 700 for the media sharing system 100 copying a media file to a new storage location. In the message flow 700, the media share component 105 may receive a modify fail 702 from the modify response 606. In this case, the media share component 105 may send a copy request 704 to copy the media file 114-1 from the network storage server 150-1 to the network storage server 150-2. The network storage server 150-1 may send a copy response 706 indicating whether the copy operation was successful and/or a copy of the media file 114-1 (e.g., via download). When there is a copy success 708, the media share component 105 may send a file store request 710 with the media file 114-1 to the network storage server 150-2. The networks storage server 150-2 may store the media file 114-1, and send a file store response 712 indicating the media file 114-1 was stored and a new link 118-4 with the new network storage location. The media share component 105 may embed the new link 118-4 with the document 116-1, and send a notification message 714 with the document 116-1 and the new link 118-4 to the client device 110-2.

Figure 8:
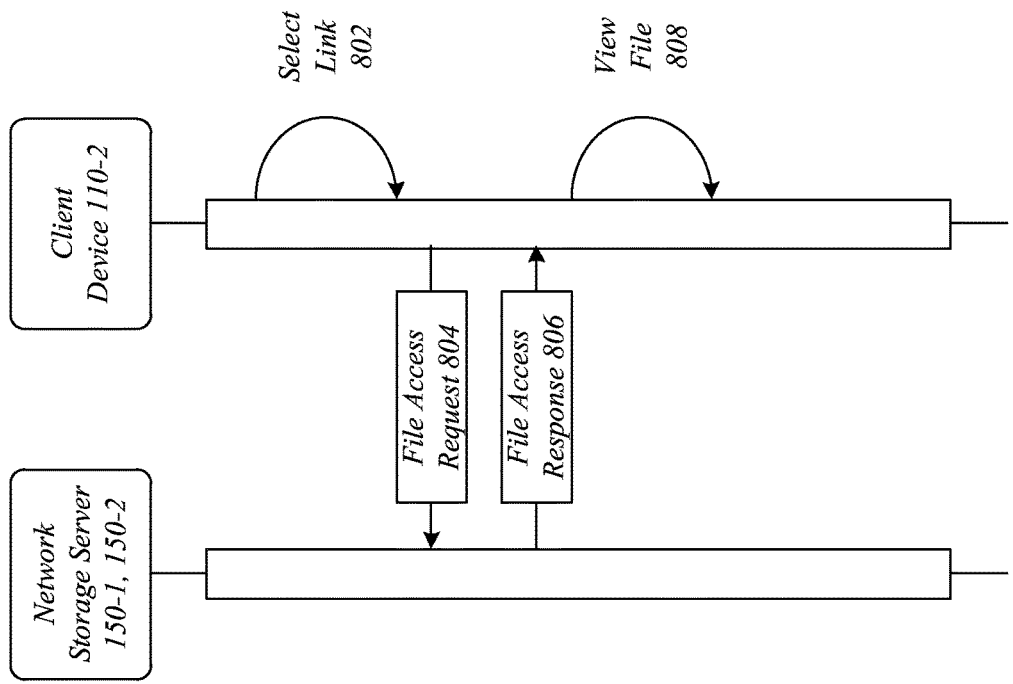
FIG. 8 illustrates an embodiment of a message flow for the media sharing system accessing a media file from a network storage location by a client device.

FIG. 8 illustrates an embodiment of a message flow 800 for the media sharing system 100 accessing a media file 114-*d* from a network storage location by a client device 110-2. In the message flow 800, the productivity application 104-2 of the client device 110-2 may receive a message 119 with the document 116-1 and one or more links 118-*g* to associated media files 114-*d*. A user of the client device 110-2 may use the user interface 108 of the productivity application 104-2 to open and view the document 116-1. When the document 116-1 is a montage document, the document 116-1 may have various tile objects presenting a snippet of information from each of the associated media files 114-*d*. When the user desires to retrieve more information from the associated media files 114-*d*, the user may perform a select link operation 802 to select an embedded link 118-*g* for the tile object and/or select the tile object with the embedded link 118-*g*. The media share component 105 of the productivity application 104-2 may send a file access request 804 to the network storage server 150-1, 150-2 storing the associated media file 114-*d*. The network storage server 150-1, 150-2 may send a file access response 806 with the associated media file 114-*d* to the client device 110-2 to allow a view file operation 808 by the user. The user may then have access to a full-fidelity version of the media file 114-*d*.

Figure 9:
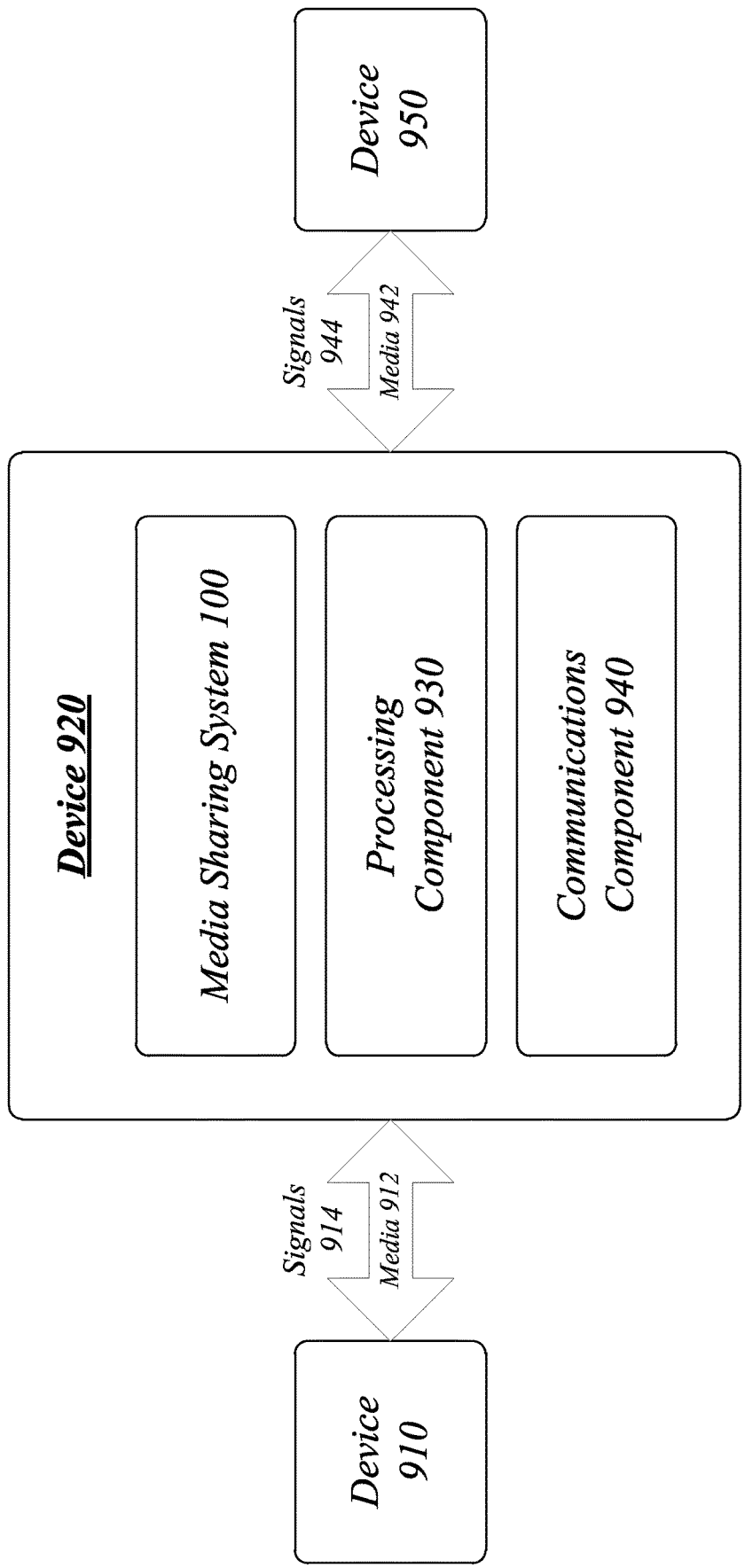
FIG. 9 illustrates an embodiment of a centralized system implementation for a media sharing system.

FIG. 9 illustrates an embodiment of a centralized system 900 for the media sharing system 100. The centralized system 900 may implement some or all of the structure and/or operations for the system 100 in a single computing entity, such as entirely within a single device 920.

The device 920 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 920 may communicate with other devices 910, 950 over a communications media 912, 942, respectively, using communications signals 914, 944, respectively, via the communications component 940. The devices 910, 950 may be internal or external to the device 920 as desired for a given implementation.

The centralized system 900 illustrates a case where the entire media sharing system 100, excluding the client devices 110-1, 110-2, is implemented in a single device or array of devices, such as a server array or modular computing platform for a cloud computing architecture. In this case, the productivity applications 104-1, 104-2 may be implemented as a single productivity application 104-3 accessible via the client devices 110-1, 110-2 via a web browser or a thin-client application version of the productivity application 104-3. The productivity application 104-3 may be used to generate a document 116-1 with a link 118-1, consume the document 116-1 with the link 118-1, or both. Similarly, the network storage servers 150-1, 150-2 may be implemented as a single network storage server 150-3 hosted with the server array. In this case, the network 130 may be implemented as a backplane or switch fabric connecting servers within the server array.

Figure 10:
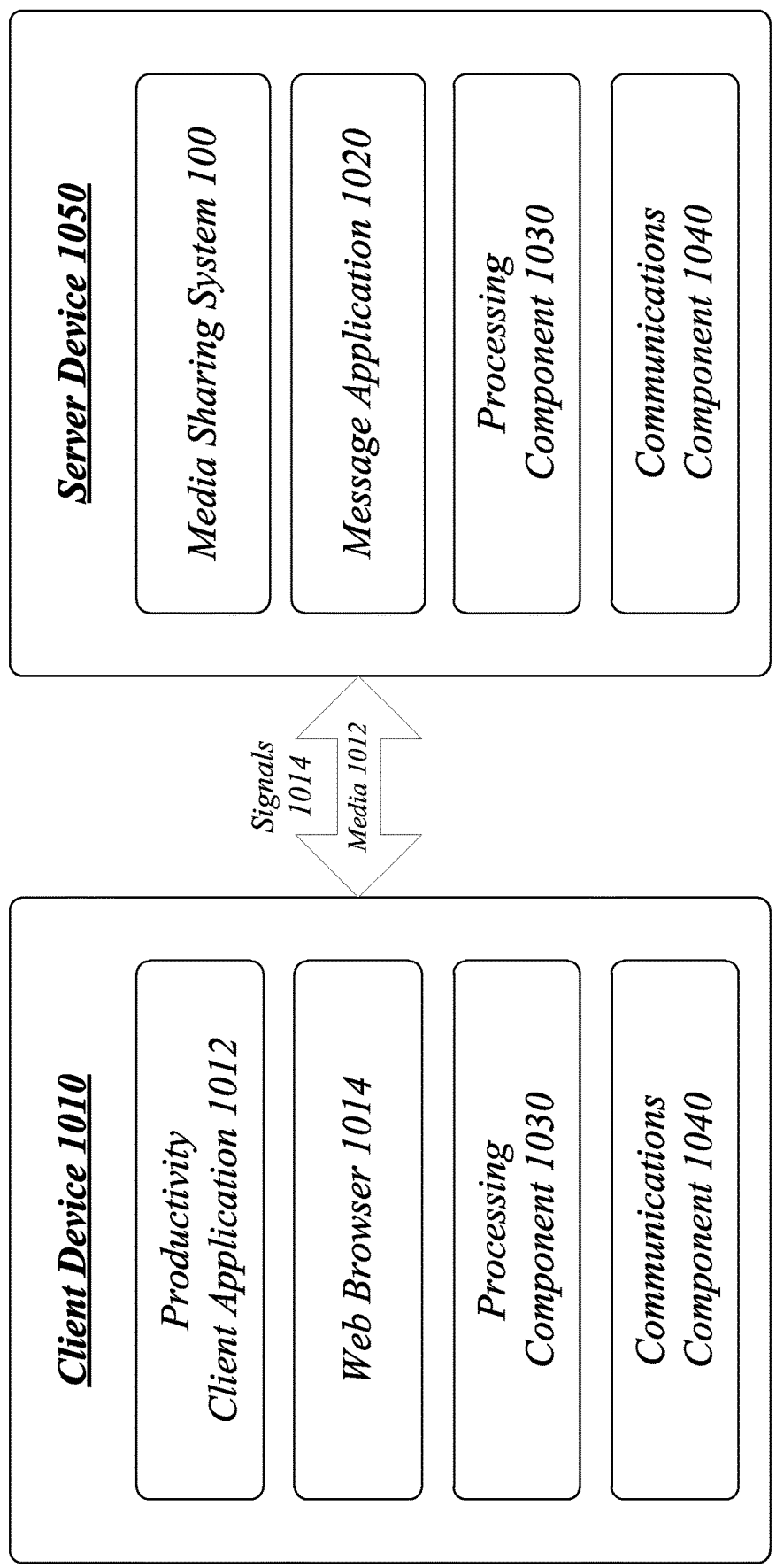
FIG. 10 illustrates an embodiment of a distributed system implementation for a media sharing system.

FIG. 10 illustrates an embodiment of a distributed system 1000 for the media sharing system 100. The distributed system 1000 may distribute portions of the structure and/or operations for the media sharing system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1050. In general, the client device 1010 and the server device 1050 may be the same or similar to the client device 920 as described with reference to FIG. 9. For instance, the client device 1010 and the server device 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications signals 1014 via the communications components 1040.

The client device 1010 may comprise or employ one or more client programs that operate to perform various methodologies in accordance with the described embodiments. In one embodiment, for example, the client device 1010 may implement a productivity client application 1012. The productivity client application 1012 may be a thin-client version of the productivity application 104-c. For instance, the productivity client application 1012 may be a viewing application specifically designed to view documents 116-f for the productivity application 104-c. The client device 1010 may further implement a web browser 1014 to access a productivity application 104-c hosted by the server device 1050.

The server device 1050 may comprise or employ one or more server programs that operate to perform various methodologies in accordance with the described embodiments. In one embodiment, for example, the server device 1050 may implement the media sharing system 100 in a configuration similar to the centralized system 900. The client device 1010 may create and access documents 116-f with associated media files 114-d using productivity software 104-c and network storage servers 150-b implemented as part of the server device 1050 via the productivity client application 1012 and/or the web browser 1014. The client device 1010 may also create and access messages 119 using the message application 1020 implemented as part of the server device 1050 via the productivity client application 1012 and/or the web browser 1014.

Figure 11:
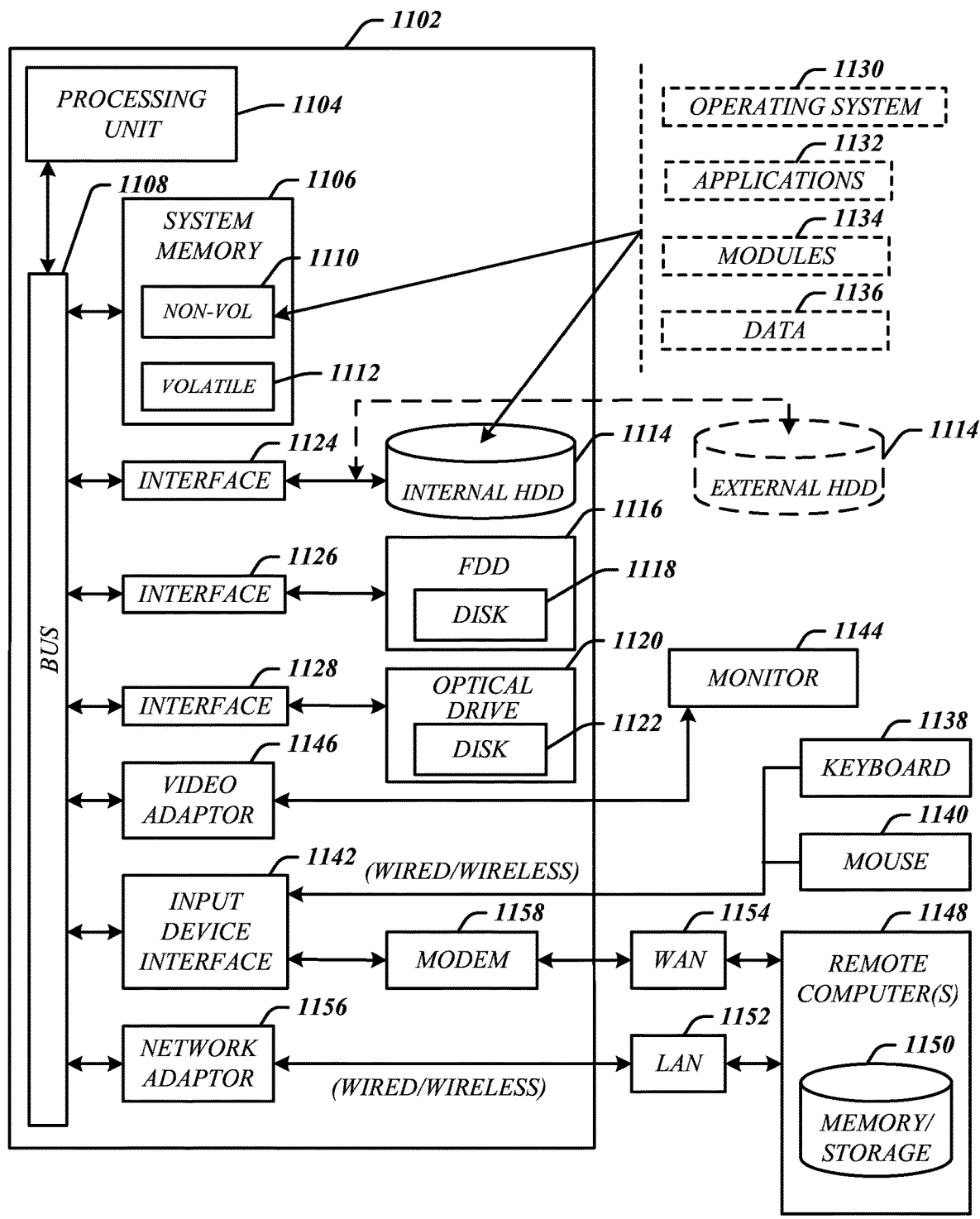
FIG. 11 illustrates an embodiment of an exemplary computing architecture for the media sharing system.

FIG. 11 illustrates an embodiment of an exemplary computing architecture 1100 suitable for implementing various embodiments as previously described, such as various devices of the media sharing system 100. In one embodiment, the computing architecture 1100 may comprise or be implemented as part of an electronic device as described with reference to FIG. 9. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the media sharing system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
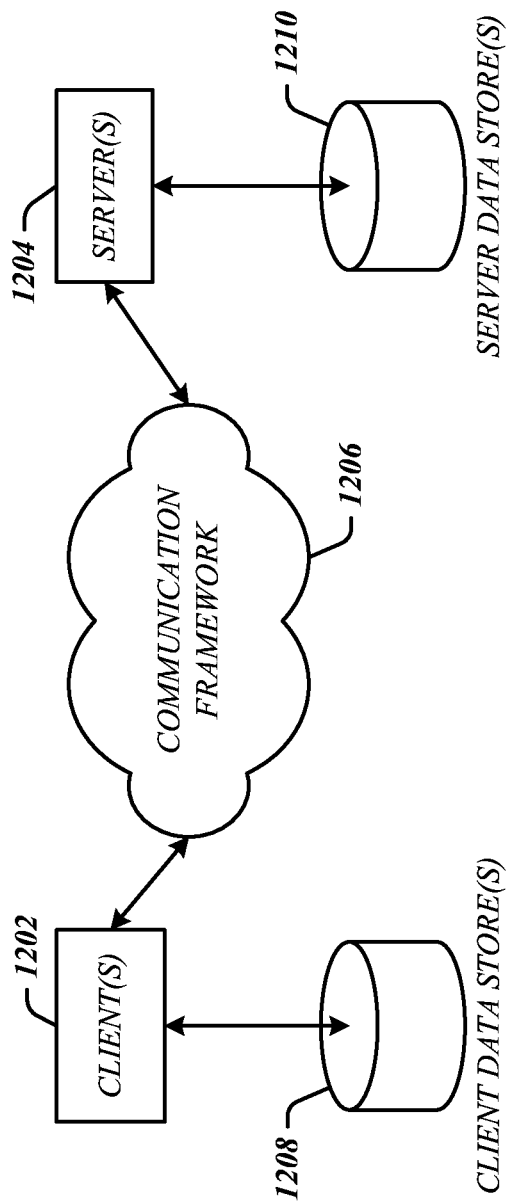
FIG. 12 illustrates an embodiment of an exemplary communications architecture for the media sharing system.

FIG. 12 illustrates a block diagram of an exemplary communications architecture 1200 suitable for implementing various embodiments as previously described, such as the media sharing system 100. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor; and
a memory communicatively coupled to the processor, the memory to store an application having a media share component operative to share a media file among a defined set of users, the media share component comprising a file manager module operative to determine a network storage location for the media file, and a file reference module operative to determine whether a current link permits access to the network storage location for the media file by the defined set of users, and if not, copy the media file from the network storage location to a different network storage location that permits access to the media file by the defined set of users, and generate a valid link to the different network storage location for the copied media file.

2. The apparatus of claim 1, the file manager module operative to determine whether the media file is a local media file or a remote media file, and send the media file to a network storage server when the media file is a local media file.

3. The apparatus of claim 1, the file reference module operative to retrieve the current link for the network storage location for the media file.

4. The apparatus of claim 1, the file reference module operative to retrieve a tokenized anonymous view universal resource locator (URL) for the network storage location, and generate the valid link as a reference comprising the tokenized anonymous view URL.

5. The apparatus of claim 1, the file reference module operative to determine that the permissions for the network storage location can be modified.

6. The apparatus of claim 1, the file reference module operative to modify permissions for the network storage location and automatically generate a valid link that permits access to the network storage location with the modified permissions.

7. The apparatus of claim 1, the application to associate the valid link with a document, and send the document and the valid link to a set of document recipients as the defined set of users.

8. A computer-implement method, comprising:
receiving a request to associate a media file with a document;
retrieving links to a network storage location for the media file;
testing the links to determine that each link is an invalid link that does not permit access to the network storage location by a document recipient;
generating a second link as a valid link that permits access to the network storage location by the document recipient; and
associating the second link with the document.

9. The computer-implemented method of claim 8, comprising determining the second link to the network storage location for the media file is not available.

10. The computer-implemented method of claim 9, comprising determining whether permissions for the network storage location can be modified to permit access by the document recipient.

11. The computer-implemented method of claim 10, comprising:
determining permissions for the network storage location can be modified to permit access by the document recipient;
modifying permissions for the network storage location to permit access by the document recipient;
retrieving a third link to the network storage location with the modified permissions; and
associating the third link with the document.

12. The computer-implemented method of claim 10, comprising determining permissions for the network storage location cannot be modified to permit access by the document recipient and copying the media file from the network storage location to a different network storage location that permits access to the media file by the defined set of users.

13. The computer-implemented method of claim 12, comprising determining whether the media file can be retrieved from the network storage location.

14. The computer-implemented method of claim 13, comprising:
determining the media file can be retrieved from the network storage location;
retrieving the media file from the network storage location;
sending the media file to a new network storage location that does permit access by the document recipient;
receiving a fourth link to the new network storage location for the media file; and
associating the fourth link to the document.

15. An article of manufacture comprising a storage hardware medium containing instructions that when executed cause a system to:
receive a request to share a media file among a defined set of users;
determine that a current link does not permit access to a network storage location for the media file by the defined set of users;
modify permissions for the network storage location from private access to public access; and
generate a valid link to the network storage location for the media file, the valid link arranged to permit access to the network storage location for the media file by the defined set of users.

16. The article of manufacture of claim 15, further comprising instructions that when executed cause the system to determine whether the media file is a local media file or a remote media file; and
generate a control directive to send the media file to a network storage server when the media file is a local media file.

17. The article of manufacture of claim 15, further comprising instructions that when executed cause the system to retrieve a current link for the network storage location for the media file;
determine whether the current link permits access to the network storage location for the media file by the defined set of users; and
generate the valid link that permits access to the network storage location for the media file by the defined set of users.

18. The article of manufacture of claim 17, further comprising instructions that when executed cause the system to:

retrieve a tokenized anonymous view universal resource locator (URL) for the network storage location; and generate the valid link as a reference comprising the tokenized anonymous view URL.

19. The article of manufacture of claim 17, further comprising instructions that when executed cause the system to:

If a tokenized anonymous view URL is not available, modify permissions for the network storage location at a network storage server; and generate the valid link as a reference to the network storage location of the media file after permissions have been modified for the network storage location.

20. The article of manufacture of claim 17, further comprising instructions that when executed cause the system to:

generate a control directive to copy the media file from the network storage location to a different network storage location that permits access to the media file by the defined set of users; and generate the valid link as a reference to the different network storage location for the copied media file.

* * * * *